United States Patent
Prevost (10) Patent No.: US 6,971,184 B2
(45) Date of Patent: Dec. 6, 2005

(54) WALL FASTENER LOCATING AND MARKING TOOL

(76) Inventor: Christopher Prevost, 23982 Arnold Dr., Sonoma, CA (US) 95476

( * ) Notice: Subject to any disclaimer, the term of this patent is extended or adjusted under 35 U.S.C. 154(b) by 0 days.

(21) Appl. No.: 10/800,188

(22) Filed: Mar. 11, 2004

(65) Prior Publication Data

US 2004/0177527 A1   Sep. 16, 2004

Related U.S. Application Data

(60) Provisional application No. 60/453,660, filed on Mar. 11, 2003.

(51) Int. Cl.[7] ............................................. G01B 3/02
(52) U.S. Cl. ........................... 33/613; 33/644; 33/666; 33/577
(58) Field of Search ......................... 33/613, 644–645, 33/666, 673, 677, 679, 574, 576, 577, 528, 33/533, 451

(56) References Cited

U.S. PATENT DOCUMENTS

| | | | |
|---|---|---|---|
| 610,021 A * | 8/1898 | Bogard | 33/644 |
| 2,741,025 A * | 4/1956 | Stewart | 30/151 |
| 3,516,165 A * | 6/1970 | Pfeffer | 33/574 |
| 4,220,309 A | 9/1980 | Eisen | |
| 4,241,510 A | 12/1980 | Radecki | |
| 4,455,756 A * | 6/1984 | Greene | 33/613 |
| 4,485,561 A | 12/1984 | Hopkins | |
| 4,512,084 A * | 4/1985 | Lieberman | 33/574 |
| 4,893,776 A * | 1/1990 | Floyd | 33/666 |
| D317,575 S * | 6/1991 | Ramsey | 33/613 |
| 5,103,573 A | 4/1992 | Ehling | |
| 5,103,574 A | 4/1992 | Levy | |
| 5,471,760 A | 12/1995 | Farris | |
| 5,520,318 A | 5/1996 | Sloop | |
| 5,634,279 A | 6/1997 | Ariyo | |
| 5,867,917 A | 2/1999 | Karon | |
| 6,000,142 A | 12/1999 | Deaton | |
| 6,026,584 A * | 2/2000 | Wegman | 33/613 |
| 6,029,362 A | 2/2000 | Miodragovic | |
| 6,032,378 A | 3/2000 | Null | |
| 6,049,991 A * | 4/2000 | Gruenberg et al. | 33/613 |
| 6,185,831 B1 | 2/2001 | Pluciennik | |
| 6,205,669 B1 * | 3/2001 | Sollars et al. | 33/613 |
| 6,305,092 B1 | 10/2001 | Tufariello | |
| 6,305,093 B1 | 10/2001 | Venola | |
| 6,739,065 B2 * | 5/2004 | Hofmeister et al. | 33/613 |
| 2002/0078582 A1 | 6/2002 | Krake et al. | |
| 2002/0078583 A1 | 6/2002 | Richardson | |
| 2004/0216319 A1 * | 11/2004 | Muchnik | 33/666 |

* cited by examiner

Primary Examiner—G. Bradley Bennett
Assistant Examiner—Tania C. Courson
(74) Attorney, Agent, or Firm—Johnson & Stainbrook, LLP; Craig M. Stainbrook; Larry D. Johnson (57) ABSTRACT

A wall fastener locating and marking tool including a generally elongate vertical member having an upper end, a lower end; a generally elongate horizontal bar attached to the upper end of the vertical member and substantially normal to the vertical member; a handle portion, and a marking tool assembly releasably connected to the vertical member and vertically slidable along the vertical. The marking tool assembly has a marking tool tip protected by a depressible collar and includes retention means for bearing an object by its wall fastener hardware during the locating, marking, and installation of the object.

19 Claims, 6 Drawing Sheets

FIG._4

WALL FASTENER LOCATING AND MARKING TOOL

CROSS REFERENCE TO RELATED APPLICATIONS

The present application claims the benefit of the filing date of U.S. Provisional Patent Application, Ser. No. 60/453,660, filed Mar. 11, 2003.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to tools and methods for hanging objects on walls and other vertical surfaces, and more particularly to a wall fastener locating and marking tool for aiding in the location and placement on walls of picture frames and other similarly planar articles.

BACKGROUND INFORMATION AND DISCUSSION OF RELATED ART

Mounting a picture on a wall in a secure and aesthetically pleasing manner has always been a challenge. This is true for other generally planar objects and for objects which obscure the device or devices employed for attachment to the wall. The problem is an inherent characteristic of the hardware employed to affix the object to the wall. Specifically, the hardware is obscured from view when the hanging operation is performed. This is as true when using picture frame wire and hanging a frame from a hook as it is when using one or more serrated metal fasteners for hanging with a hook, nail, or other fastener. Accordingly, locating, balancing, and leveling the object (when such is appropriate) are difficult and time consuming.

Accordingly, there have been numerous attempts in the prior art to provide a device for positioning a picture or similar object for hanging on a wall. Some devices also include means to facilitate the hanging operation itself. The most notable illustrative examples include the following:

U.S. Pat. No. 4,241,510, to Radecki, which discloses a device for aiding in the hanging of a picture or similar wall supported member. The device includes an inverted T-shape having cross arms and a neck part. Slide members are carried on the cross arms to engage a hanging wire. Locating marks on the neck part indicate the top of the picture and are used to position the device at a desired wall location for the picture with the slide members locating the hangers, such as hooks.

U.S. Pat. No. 5,471,760 to Farris, which teaches a frame hanging apparatus with the hanging wire of the framed member being upwardly deflected and tightened as though supporting the weight of the framed member. The apparatus includes an upright channel incorporating a hook proximate its lower end for engaging the mid-portion of a picture frame hanging wire. The upper portion of the channel includes a slide adjustably positionable along the channel and defining a downwardly facing, plane abutment surface normal to the longitudinal extent of the channel for downwardly abutting the upper surface of a frame member from which the hanging wire is supported. The single hook may be substituted for by a pair of oppositely laterally offset hooks for use in determining the desired location of a pair of frame hanging hooks.

U.S. Pat. No. 5,867,917 to Karon, shows a picture hanger locating device for use with wire and hook hangers. The device includes a cord tensioning member removably positioned at an upper end and placed over the upper edge of the picture frame and at a lower end spaced from said first end in communication with the frame cord to move the cord to the tensioned position it will be in when the cord is disposed over a hook on the wall. A wall marking device is secured at the lower end to mark the wall at the location along the length of the cord where the hook should be placed to engage the cord when the picture is hung.

U.S. Pat. No. 6,185,831 to Pluciennik discloses a picture hanging tool that includes a cuboid mounting bracket with a rear wall having a threaded opening, an adhesive strip on its bottom side for releasable attachment to a frame, and a rectangular opening extending from its top to its bottom side. An elongated L-shaped stem is adjustably inserted through rectangular opening and is held within the rectangular opening by an adjustment screw; it includes a point at the terminus of its lower arm.

U.S. Pat. No. 5,520,318, to Sloop, teaches a picture hanging tool that includes a tool with a frame. The frame has an inner part that lies in front of a picture to be hung and which holds a hook device; and it further includes an outer part comprising a base extending rearwardly from the top of the inner part and a handle extending downwardly from the rear of the base. A driving mechanism is movably mounted on the frame and includes a drive end positioned on the inner part of the frame and movable along a driveline. This is directed to drive a fastener into the wall. The drive mechanism also includes an actuator end positioned on the frame outer part, and this portion forcefully moves the drive end along the driveline. The drive mechanism also includes a strike member slidably mounted on the frame to move parallel to the driveline, with the strike member having an outer end forming the actuator and designed to be operated by hitting it with a hammer. The device positions a hanging hook and drives in the nail holding the hook, while simultaneously holding the wire in the hook trough.

Finally, U.S. Pat. No. 6,032,378 to Null shows a picture hanging tool having horizontal leg fixed relative to a slotted vertical leg to form a T-shaped device. A sliding member moves along the slot in the vertical leg. When the horizontal leg is positioned adjacent the top edge of a frame or other object, the sliding member is moved to pinpoint the vertical location of the hanging mechanism relative to the top edge of the object being hung. Once this position is found, the sliding member is locked in place, the object is set aside, and the tool is used to located the proper placement for the hook or hanger. This is done by placing the tool back on the wall and positioning the horizontal leg at the previously located position representing the top of the object; the sliding member then indicates the appropriate position for placement of the hook or hanger.

Other relevant patents generally reflecting the state of the art include U.S. Pat. No. 6,305,093 to Venoia; U.S. Pat. No. 5,634,279 to Ariyo; U.S. Pat. No. 5,103,573 to Ehling; U.S. Pat. No. 4,485,561 to Hopkins, Sr.; U.S. Pat. No. 5,103,574 to Levy; U.S. Pat. No. 6,029,362 to Miodragovic; U.S. Pat. No. 6,000,142 to Deaton; and U.S. Pat. No. 4,220,309 to Eisen.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention is an improved wall fastener locating and marking tool. A principal object of the inventive apparatus is to provide a means to quickly and precisely locate and mark the aesthetically and/or structurally optimal position for a wall fastener. Additionally, after the position is so marked, it is an object to provide means to hang the object in a substantially level orientation. To achieve these objectives, in its most essential aspect the inventive apparatus comprises a vertical component, a horizontal component, a handle portion, and a marking tool assembly, the physical and functional combination of which provides a user with the ability to mark an optimal fastener point on a wall while simultaneously, and single-handedly, holding the object to be hung in an orientation substantially equivalent to that it will have when it is hung on the wall fastener.

It is another object of the present invention to provide a new and improved wall fastener locating and marking tool that enables the user to move an object along a wall to evaluate possible hanging positions without damaging the wall surface.

A further object or feature of the present invention is a new and improved wall fastener locating and marking tool that facilitates locating and marking the ideal position for a wall fastener when the object must be hung in a generally level orientation.

An even further object of the present invention is to provide a novel wall fastener locating and marking tool that may be operated with one hand.

Still another object of the present invention is to provide a wall fastener locating and marking tool that can be adjusted to fit hanging hardware on a variety of picture frame sizes.

Yet another object of the present invention is to provide a wall fastener locating and marking tool that facilitates accurate fastener placement without the need to take measurements.

A further object of the present invention is to provide an economical a wall fastener locating and marking tool that achieves the foregoing objects while being simple to manufacture.

Other novel features which are characteristic of the invention, as to organization and method of operation, together with further objects and advantages thereof will be better understood from the following description considered in connection with the accompanying drawings, in which a preferred embodiment of the invention is illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trade-mark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawing wherein.

DRAWING REFERENCE NUMERALS 100 wall fastener locating and marking tool generally
110 vertical member
120 front side
130 back side
140 lower end
150 upper end
160 right side
170 left side
180 longitudinal axis (of vertical member)
190 slot
200 handle portion
210 angle
220 grip portion
230 wrap around grip
300 horizontal bar
305 mid-portion of horizontal bar
310 front side
320 back side
325 bottom side
340 recess
350 connection means
360 hole
370 mid-point of longitudinal axis
380 level bubble
390 foam blocks
395 bottom side of foam blocks
400 marking tool assembly
410 marking punch
420 pointed tip
430 threaded middle portion
440 conical cap
450 channel
460 retention plate
470 threaded nut
480 front side
490 rear side
500 female threaded hole
510 gripping structure
520 protective collar
530 compression spring
540 cavity
545 channel
550 alignment plate
600 picture frame
610 upper side of frame
620 frame wire
700 wall
710 indentation
800 holding clip
810 non-slip surface

DETAILED DESCRIPTION OF THE INVENTION

Figure 1A:
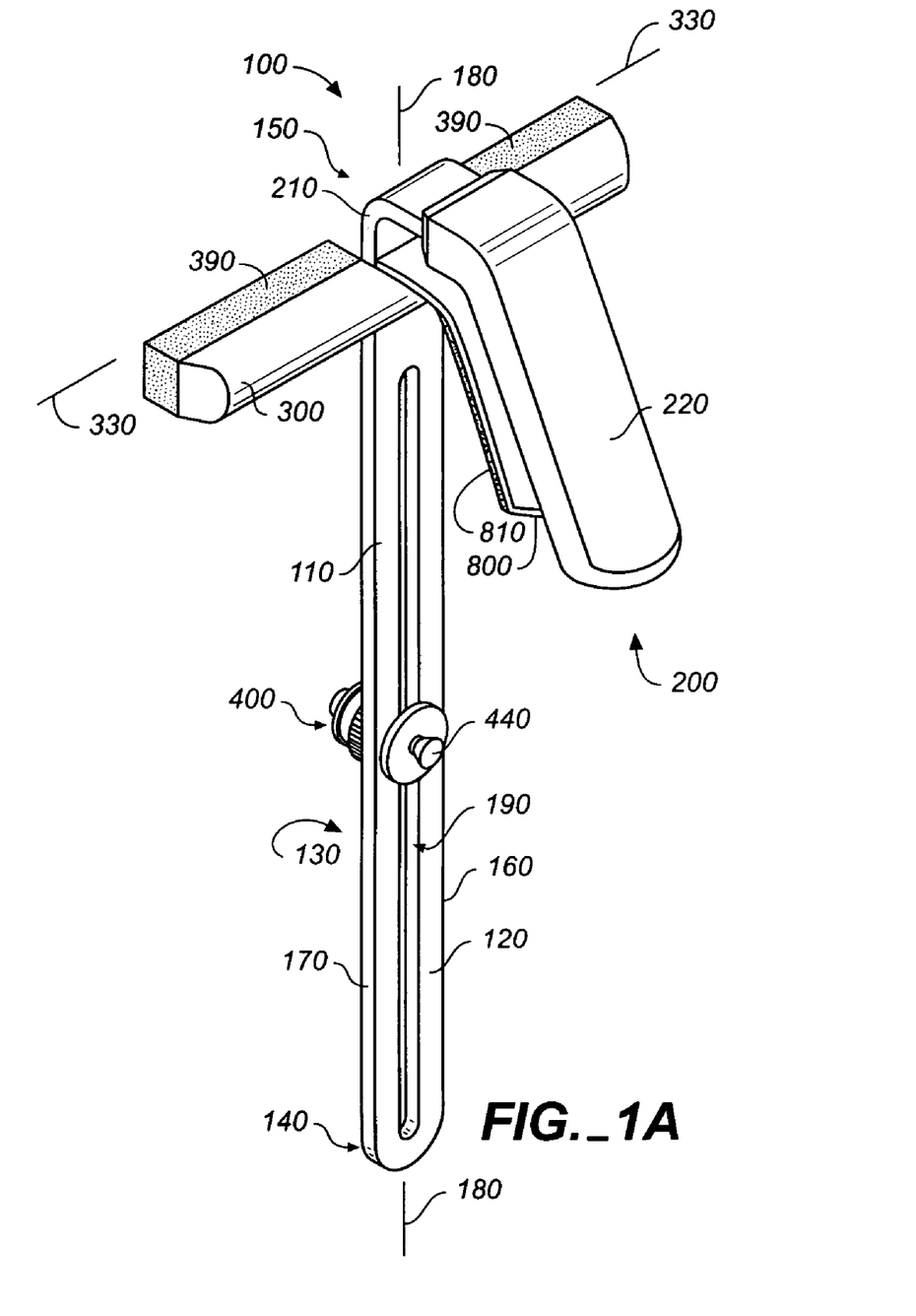
FIG. 1A is a front left perspective view of the preferred embodiment of the wall fastener locating and marking tool of the present invention.
Figure 1B:
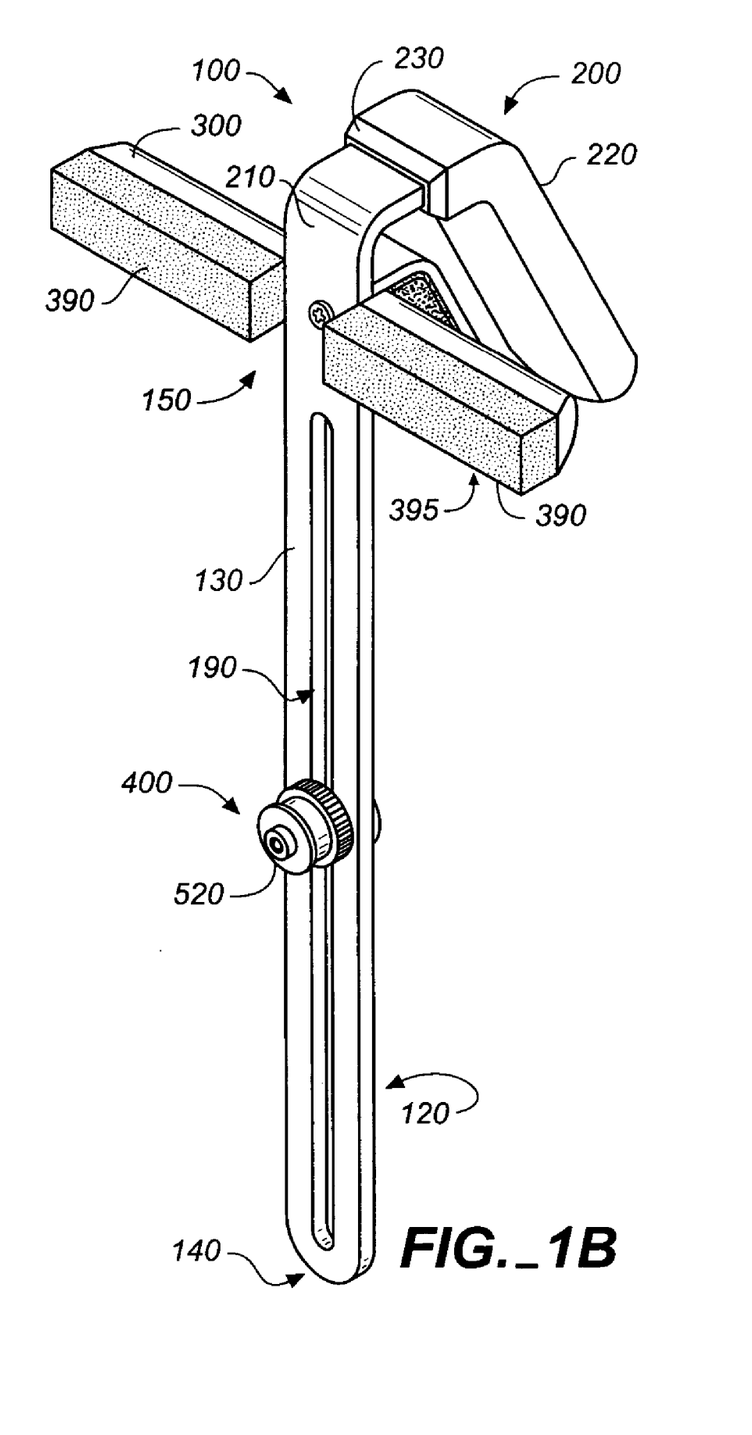
FIG. 1B is a rear left perspective view thereof.
Figure 2:
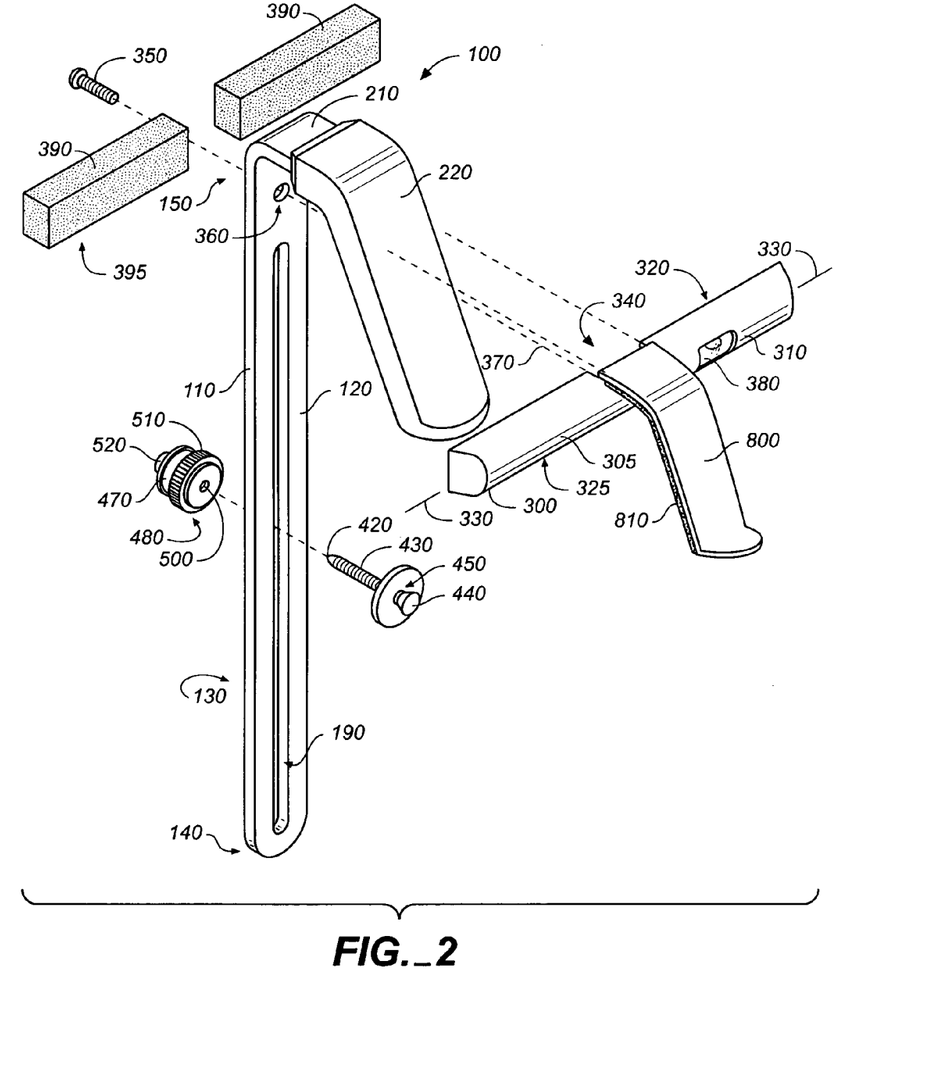
FIG. 2 is an exploded front left perspective view of the inventive apparatus.
Figure 3:
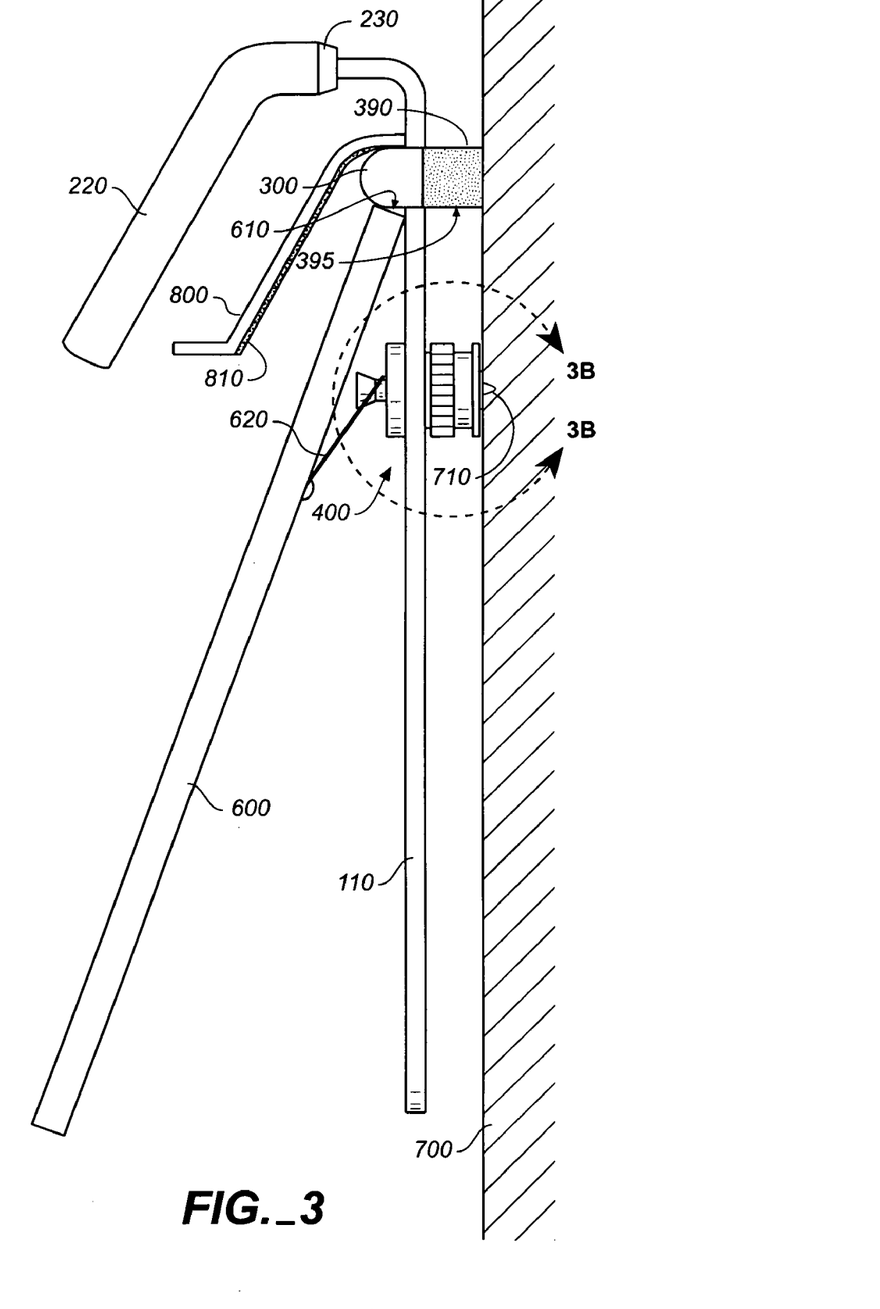
FIG. 3 is a side view in elevation showing the wall fastener locating and marking tool in use.

Referring to FIGS. 1 through 3, wherein like reference numerals refer to like components in the various views, there is illustrated therein a new and improved wall fastener locating and marking tool, generally denominated 100 herein. Collectively these views show that in a first preferred embodiment, the inventive apparatus includes four primary components: a vertical component, a horizontal component, a handle, and a marking component. The vertical component first includes a vertical member 110 having a front side 120, a back side 130, a lower end 140, an upper end 150, a right side 160, a left side 170, and a longitudinal axis 180. The vertical member further includes a slot 190 running from a point proximate the lower end to a point proximate the upper end.

The apparatus also includes a handle component comprising a handle portion 200 connected to and disposed from the upper end of the vertical member. In the first preferred embodiment, the handle portion is structurally integral with the vertical member, comprising a bend or angle 210 at the upper end of the vertical member which directs an extension of the vertical member forwardly and then downwardly to form a handle portion 220. It will be appreciated, however, that the handle portion could be structurally separable from the vertical member and attached thereto with any of a number of suitable connection means, as are well known in the art. Preferably the grip portion includes a molded wrap-around rubber, synthetic rubber, or polymeric grip 230.

The apparatus next includes a horizontal component comprising a generally elongate horizontal bar 300 having a front side 310, a back side 320, a bottom side 325, and a longitudinal axis 330. The bottom side 325 preferably has a substantially planar surface parallel to the longitudinal axis. The horizontal bar may include a recess, rectangular groove, or dado 340 at its mid-portion 305, which mates with the profile of the vertical member so that the horizontal bar can be securely attached to the vertical member proximate its upper end with connection means 350, such that the longitudinal axis 330 of the horizontal bar is substantially perpendicular to the longitudinal axis 180 of the vertical member. Preferably the connection means comprises a simple threaded screw adapted for insertion through a hole 360 proximate the upper end of the vertical member and into the back side of the horizontal bar at substantially the mid-point 370 along the longitudinal axis. The horizontal bar further includes a level bubble 380 disposed on any surface other than the rear surface and orientated substantially parallel to the longitudinal axis 330 of the horizontal bar, such that when the level bubble is centered, the longitudinal axis of the vertical member is plumb. Preferably, the back side of the horizontal bar includes one or more blocks of foam, padding, or other soft material 390 adapted to prevent damage or marring of a finish on a vertical surface when the inventive tool is in use. The materially is preferably substantially cuboid and includes a bottom side 395 which is substantially planar and parallel to the longitudinal axis of the horizontal bar 300.

Finally, the wall fastener locating and marking tool of the present invention includes a marking component comprising a marking tool assembly 400, which is vertically adjustable and removable. The marking tool assembly includes a marking punch 410 having a pointed tip 420, a threaded middle portion 430, and a conical cap 440 which provides a channel 450 in which fastener hardware, such a picture frame wire or serrated bar, may be disposed when in use. The marking tool assembly further includes a retention plate or washer 460 for frictional placement against the front side 120 of vertical member 110.

Figure 3A:
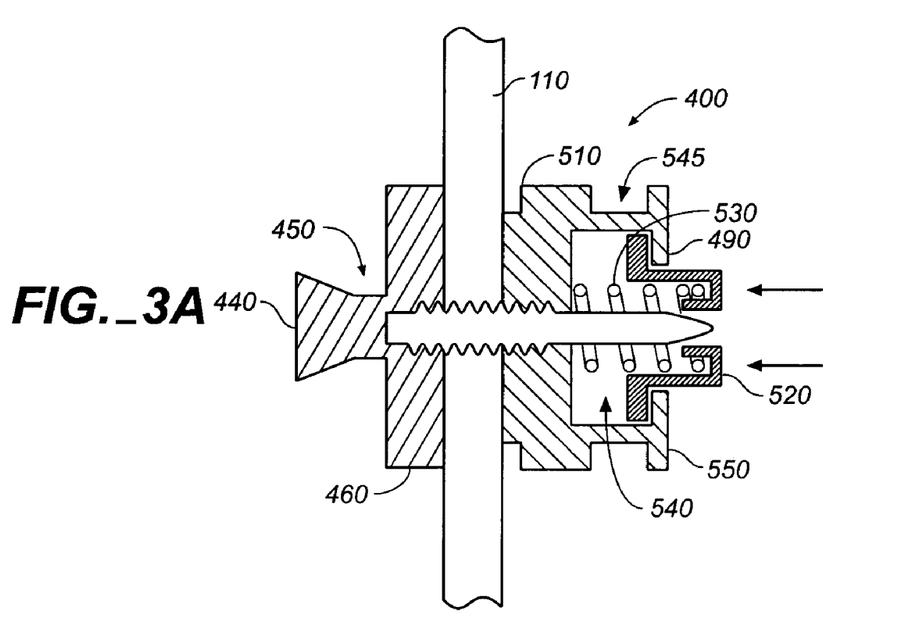
FIG. 3A is a detailed cross-sectional side view in elevation of the adjustable marking assembly of the inventive apparatus, showing the marking tip concealed by and disposed within a depressible protective collar.
Figure 3B:
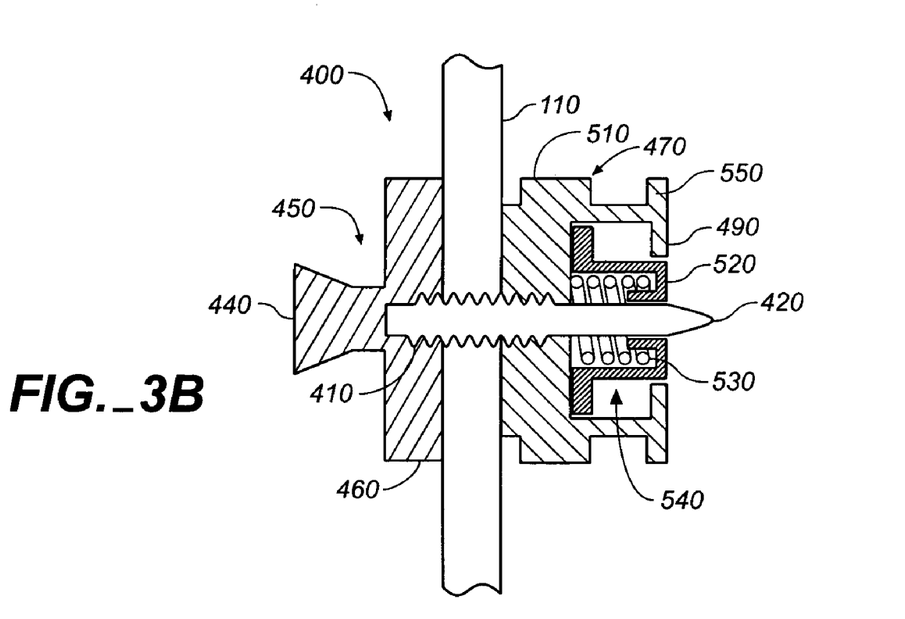
FIG. 3B is a detailed cross-sectional side view in elevation showing the marking tip exposed after depression of the protective collar.

Marking tool assembly next includes a threaded nut 470 and having a front side 480 for surface-to-surface frictional contact with the rear side of vertical member 110, and a rear side 490. The nut includes a female threaded hole 500 extending from the front adapted to releasable capture the threaded punch when the latter is inserted through the longitudinal slot 190 of vertical member 110. The nut may include annular gripping structure 510 disposed about its surface to facilitate secure clamping. Further, the nut preferably includes a depressible protective collar 520 concentrically disposed around marking punch 410 so as to conceal the tip 420 until the user intends to make a mark. The collar is generally biased or urged into an extended position [FIG. 3A] by a compression spring 530 axially disposed around the marking punch and disposed within a cylindrical cavity 540, in a manner well known in the art. The spring may be a helical compression spring, a single volute band, a double volute spring, or it may be suitably replaced by any of a number of compressible and deformable materials that have shape memory, such as a rubber collar. When the protective collar 520 is pushed inwardly, i.e. toward the front side of the nut, the protective collar depresses sufficiently to expose the marking tip to permit making a small mark on a wall or other vertical surface. The nut may further include an alignment plate 550 to assist in stabilizing the tool when making a mark. The alignment plate 550 and the gripping structure 510 define a channel 545 which extends concentrically around the nut body.

Figure 4:
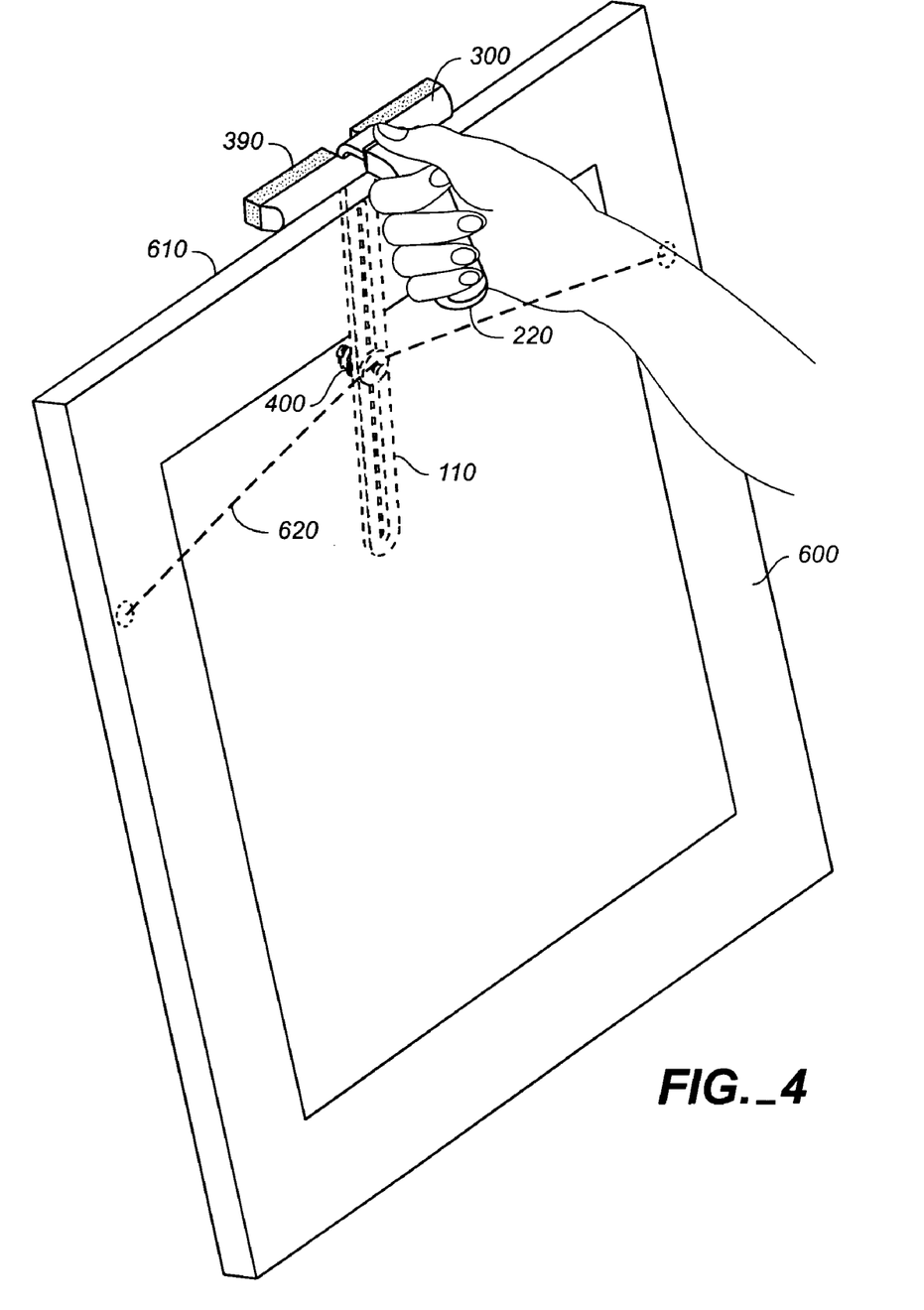
FIG. 4 is a perspective view showing the inventive apparatus in use.

Referring now to FIGS. 3 and 4, each of which show the inventive apparatus in use, it will be appreciated that the wall fastener locating and marking tool of the present invention may be employed in two general steps: In a first step, shown in FIG. 3, the tool is used to locate and mark the optimal position for placement a wall fastener; and in a second step, the tool is used to hang the object on the fastener and then to level the object. Referring specifically to FIG. 3, it will be seen that a user may hold a picture frame 600, or similarly planar object, having an upper edge 610 and fixture hardware, such as a picture frame wire 620, by installing the wire in the channel 450 in cap 440, loosening and then adjusting the marking tool assembly 400 along the length of vertical member 110 until the upper edge 610 of frame 600 is approximated to the bottom side 325 of horizontal bar 300 so that the frame edge is substantially parallel with the horizontal axis of the horizontal bar. The marking tool assembly is then tightened with nut 470. The tool may then be lifted to a point proximate a desired fixture point on the wall 700, and the tool moved across the wall until the upper edge of the frame is at substantially the desired elevation and, by using the level bubble, in a generally level orientation. The tool is then pressed against the wall to depress the protective collar 520 and to allow the marking tip to be exposed. The tip will make an indentation 710 in the wall at the desired point. It should be noted that the grip portion 220 of the handle portion 200 is angled relative to both the horizontal bar 300 and the vertical member 110 so that the tool provides the mechanical advantage of leverage and may be pivoted about the fulcrum formed at the contact between the foam block and the wall during the above-described marking procedure. The grip portion may range from between parallel to the vertical member to perpendicular to the horizontal bar, but the optimal angle approaches 45 degrees relative to each.

FIG. 4 shows the next step in the installation process. Continuing from the immediately preceding step, the wall fastener is installed on the wall at the marked location. Next frame wire 620 is removed from the marking tool assembly. The assembly is then loosened and moved slightly downwardly in the slot 190 and the wire is reinstalled, this time on the other side of vertical member 110 in channel 545 on nut 470. The frame is again hoisted until the wire can be positioned over the hook of the wall fastener. The tool can then be removed from behind the frame and the bottom side 395 of foam blocks 390 placed atop the upper side 610 of frame 600 so that the frame can be finally leveled. With this final step an installation would be complete.

An optional clip or tab 800 may be installed immediately under the handle portion, arching over the horizontal bar, and may be provided with a non-slip resilient base 810 to stabilize and hold a picture frame in place during the locating and marking operation.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. For instance, while the preferred embodiment of the inventive apparatus includes a generally planar upright member, this element could easily comprise a structure having any of a number of suitable cross-sectional shapes and still perform the desired functions of the apparatus show. Were the upright member cylindrical or polygonal in shape, but essentially a slender shaft, the adjustable marking assembly could be disposed around the upright member and could releasably capture the shaft with an adjustment screw, rather than being disposed through a slot. Thus, there is nothing imperative in the preferred shape of the upright member.

Furthermore, it will be appreciated that the marking tip need not be a rigid point adapted for making an indentation. Rather, it could comprise a writing instrument with means for transferring ink or another writing medium to the wall.

Therefore, the above description and illustrations should not be construed as limiting the scope of the invention, which is defined by the appended claims.

What is claimed as invention is:

1. A wall fastener locating and marking tool for aiding in the location and placement on walls of planar articles having wall fastener hardware, said apparatus comprising:
    a vertical member having an upper end, a lower end, a front side, a back side, and a longitudinal axis;
    a horizontal bar attached to said vertical member proximate said upper end and having a front side and a back side, a longitudinal axis substantially perpendicular to said longitudinal axis of said vertical member, and further including leveling means;
    a handle portion connected to and disposed from said upper end of said vertical member and extending outwardly from said front side, such that it is disposed over the top of the planar article when in use; and
    a marking tool assembly releasably connected to said vertical member and slidable along said longitudinal axis of said vertical member, said marking tool assembly including a marking tool having a tip and retention means;
    whereby when said apparatus is in use, the planar article is suspended by its wall fastener hardware by said retention means and is disposed between said handle portion and said front side of said vertical member.

2. The apparatus of claim 1, wherein said vertical member includes at least a front side and a back side.

3. The apparatus of claim 1, wherein said vertical member further includes a slot running proximate said lower end to proximate said upper end.

4. The apparatus of claim 1, wherein said leveling means is a level bubble disposed in a substantially parallel orientation to said longitudinal axis of said horizontal bar.

5. The apparatus of claim 1, wherein said horizontal bar is generally elongate and includes at least a bottom side and a back side.

6. The apparatus of claim 5, wherein said bottom side of said horizontal bar is substantially planar and is parallel to said longitudinal axis of said horizontal bar.

7. The apparatus of claim 1, wherein said horizontal bar has a mid-portion and further includes a recess at said mid-portion which mates with said vertical member.

8. The apparatus of claim 1, further including padding material attached to said back side of said horizontal bar and having a bottom side substantially planar and parallel to said longitudinal axis of said horizontal bar.

9. The apparatus of claim 1, wherein said handle portion is integral with said vertical member.

10. The apparatus of claim 9, wherein said vertical member includes a bend at said upper end which directs an extension of said vertical member forwardly and downwardly to form said handle portion.

11. The apparatus of claim 1, wherein said handle portion includes a grip portion having a molded grip.

12. The apparatus of claim 1, wherein said marking tool assembly further includes a protective collar disposed around said marking tool tip.

13. The apparatus of claim 12, wherein said marking tool assembly includes a marking punch having a pointed tip comprising said marking tool tip.

14. The apparatus of claim 13, wherein said marking punch further includes a threaded middle portion and a conical cap, the latter providing a channel in which fastener hardware may be disposed when in use.

15. The apparatus of claim 14, wherein said marking tool assembly includes a nut having a front side for surface-to-surface frictional contact with said vertical member, a rear side, and a threaded hole extending from the front adapted to releasably capture said threaded middle portion of said marking punch.

16. The apparatus of claim 15, wherein said nut includes a cavity housing resilient material which urges said protective collar into an extended position, and wherein said protective collar is axially disposed around said marking tool tip and is depressible into the cavity so as to expose said marking tool tip.

17. The apparatus of claim 14, wherein said nut includes annular gripping structure and a retention plate each concentrically disposed on said nut and defining a channel intermediate said gripping structure and said retention plate.

18. The apparatus of claim 1, further including a resilient clip interposed between said handle portion and said vertical member for releasably capturing the planar article between said clip and said vertical member.

19. The apparatus of claim 18, wherein said clip includes a non-slip resilient base.

\* \* \* \* \*